United States Patent [19]

Koyama et al.

[11] 4,349,247

[45] Sep. 14, 1982

[54] MIRROR APPARATUS FOR AUTOMOBILE

[75] Inventors: Yukio Koyama; Tsutomu Kondo, both of Yokohama; Mikio Matsuzaki, Hadano; Kunio Akizuki, Saitama, all of Japan

[73] Assignees: Mitsubishi Motors Corp.; Ichikoh Industries Ltd., both of Tokyo, Japan

[21] Appl. No.: 173,907

[22] Filed: Jul. 30, 1980

[30] Foreign Application Priority Data

Jul. 31, 1979 [JP] Japan ............................ 54-104883[U]
Jul. 31, 1979 [JP] Japan ............................ 54-104884[U]
Jul. 31, 1979 [JP] Japan ............................ 54-104885[U]

[51] Int. Cl.³ .............................................. B60R 1/08
[52] U.S. Cl. .................................. 350/302; 350/277; 350/307
[58] Field of Search ............... 350/277, 283, 293, 301, 350/302, 307

[56] References Cited

U.S. PATENT DOCUMENTS 4,291,946 9/1981 van der Lely ...................... 350/302

FOREIGN PATENT DOCUMENTS 55-59035 5/1980 Japan ................................... 350/293
55-76720 6/1980 Japan ................................... 350/302
55-76723 6/1980 Japan ................................... 350/302

*Primary Examiner*—F. L. Evans
*Attorney, Agent, or Firm*—Wenderoth, Lind & Ponack

[57] ABSTRACT

A mirror apparatus for automobile including an objective mirror region having an objective mirror and an ocular mirror region having a planar ocular mirror, wherein: the objective mirror is provided outside the automobile body to face an area of ground surface centering around the vicinity of the corner of the automobile body located opposite to the driver's seat, and the ocular mirror is disposed in a space within the ocular mirror region which has a first aperture for receiving therethrough an image reflected by the objective mirror and a second aperture for transmitting therethrough an image reflected by the ocular mirror to the driver's eyes. The first aperture has a limited size necessary for receiving the image on the objective mirror region reflected on the ocular mirror. Thus, this mirror apparatus enables the driver to have a good view of the blind area which otherwise would develop on that site located opposite to the driver's seat, and also is able to block the entry of unnecessary light to the mirrors.

10 Claims, 20 Drawing Figures

MIRROR APPARATUS FOR AUTOMOBILE

BACKGROUND OF THE INVENTION (a) Field of the Invention

The present invention relates to a mirror apparatus for an automobile, and more particularly it pertains to a mirror apparatus for an automobile which permits the driver to have a view of the blind area which may take place on that external side of the automobile located opposite to the location of the driver's seat.

(b) Description of the Prior Art

In a mirror of the above-mentioned type for use in a large-sized truck or other automobile wherein the driver's seat is located at a great distance from the ground, there exists a blind area on that external side of the automobile located opposite to the driver's seat, in spite of the fact that such an automobile is provided with a main side-mirror which is an independent ocular mirror and an under mirror which is another independent ocular mirror provided below the main ocular mirror. Because of such a known arrangement of mirrors, there frequently occurs that, when a person or a bicycle rider happens to be within such a blind area, the driver, from his position, is unable to recognize the presence of such a person or bicycle, and that in case the driver intends to turn in the direction of the blind area, the automobile drags or entangles the person or bicycle into the underside of the automobile due to the difference in the turning angle of the front wheels and rear wheels.

Referring now to FIG. 1, there is shown a part of the front side of an automobile such as truck having a known mirror apparatus. As shown, the mirror apparatus of, for example, a truck is comprised of a stay a to which are secured a main outside mirror b and an under mirror c. The main outside mirror b provides the driver a view as shown at B in FIG. 2. The view obtained from the under mirror c is shown at C in FIG. 2. The area W which is necessary for safety purposes contains a blind area Y. Because the under mirror has a curvature which is obtained by a radius of 100 mm to 120 mm, the image provided by the under mirror c is relatively small, and moreover this image has a large distortion and is poor in its visuality. Furthermore, the respective images provided by these two mirrors are sideways-inverted images, so that there is the problem that the driver has a difficulty in getting hold of the directional sense of the object. Another problem arises in that the under mirror c per se hinders the field of view. Also, the position of eyes, i.e. the position of the eyes of the driver at which the driver can have the best visibility of the image of an object varies with the physical size of the driver. In the known mirror apparatus, it has been difficult to adjust the position of the mirrors by a single person, and the driver most inconveniently is required to step down and get out of the driver's seat for the making of such an adjustment.

Because of these inconveniences, there has been developed a mirror apparatus presenting no such blind area as stated above and providing a good visibility of the image of an object without the accompaniment of the horizontal inversion of the image. Even in such a proposal, there still remains the problem that the adjustment of visual field is difficult. Also, in such a known combination mirror apparatus, the sunlight and the street lights impinge onto an ocular mirror as these lights are reflected by an objective mirror to be viewed by the driver as dazzling lights. Furthermore, in case an ocular mirror which is watched directly by the driver is arranged so that its mirror surfaces upwardly or to the sky, there will occur an instance such that, in case street lights and other lights are positioned above the ocular mirror, the light rays from these light sources will directly impinge onto the ocular mirror, so that unnecessary lights will be reflected into the driver's chamber by the ocular mirror. Such reflected lights, practically, constitute a hindrance, and in case these lights impinge onto the eyes of the driver, they will be dazzling light. Even if these unnecessary lights do not constitute a dazzling light, they could destroy the contrast of the image, so that there could occur an instance that the image which is reflected by the ocular mirror becomes dark and invisible. Such an occurrence will bring about a serious problem in the driving of automobiles.

SUMMARY OF THE INVENTION

It is, therefore, a fundamental object of the present invention to provide a mirror apparatus for an automobile, which is free of the inconveniences encountered in the prior art, and which eliminates the blind area which develops on that external side of the automobile located opposite to the driver's seat, and which unfailingly prevents the occurrence of unwanted dazzling lights, and which improves the visibility of images on the ocular mirror.

Another object of the present invention is to provide a mirror apparatus of the type described above, which permits one to easily make adjustments of the visual field of the mirror.

These an other objects as well as the features of the present invention will become apparent in the following detailed description, when taken in conjunction with the accompanying drawings.

DETAILED DESCRIPTION OF THE PREFERRED EMBODIMENTS

Description will hereunder be made of a first embodiment of the present inveniton by referring to FIGS. 3 to 6.

Figure 1:
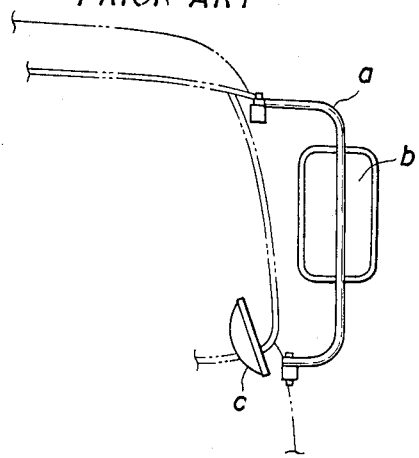
FIG. 1 is a diagrammatic explanatory illustration of mirror apparatus of the prior art.
Figure 2:
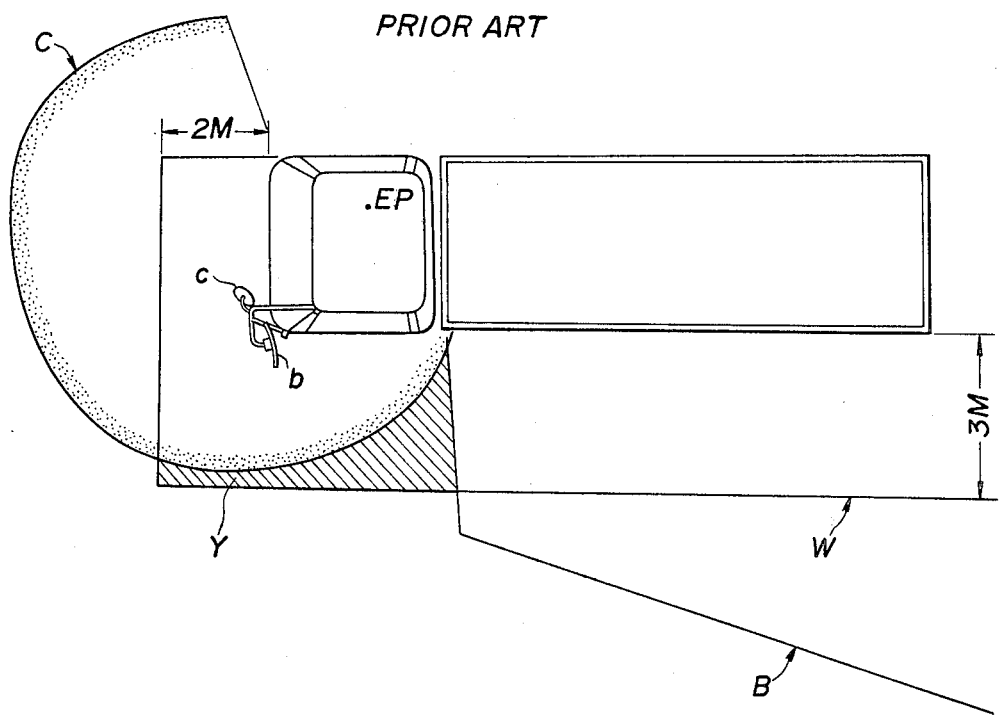
FIG. 2 is a diagrammatic explanatory illustration, showing the range of visual field provided by the mirror apparatus shown in FIG. 1.
Figure 3:
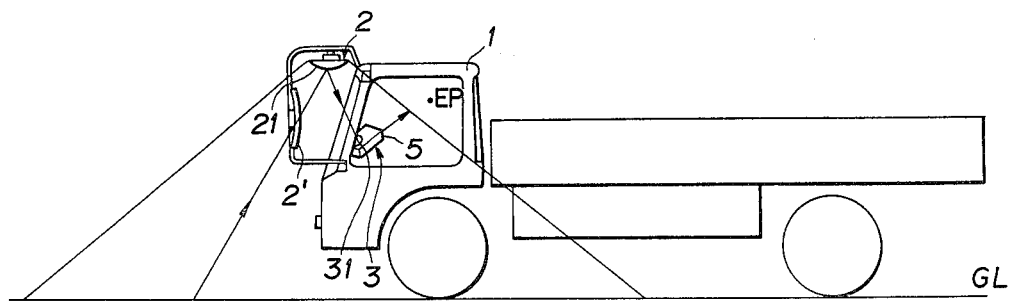
FIG. 3 is a diagrammatic explanatory illustration, showing a first embodiment of the mirror apparatus according to the present invention.

FIG. 3 shows an outline of the mirror system of this first embodiment.

Figure 4:
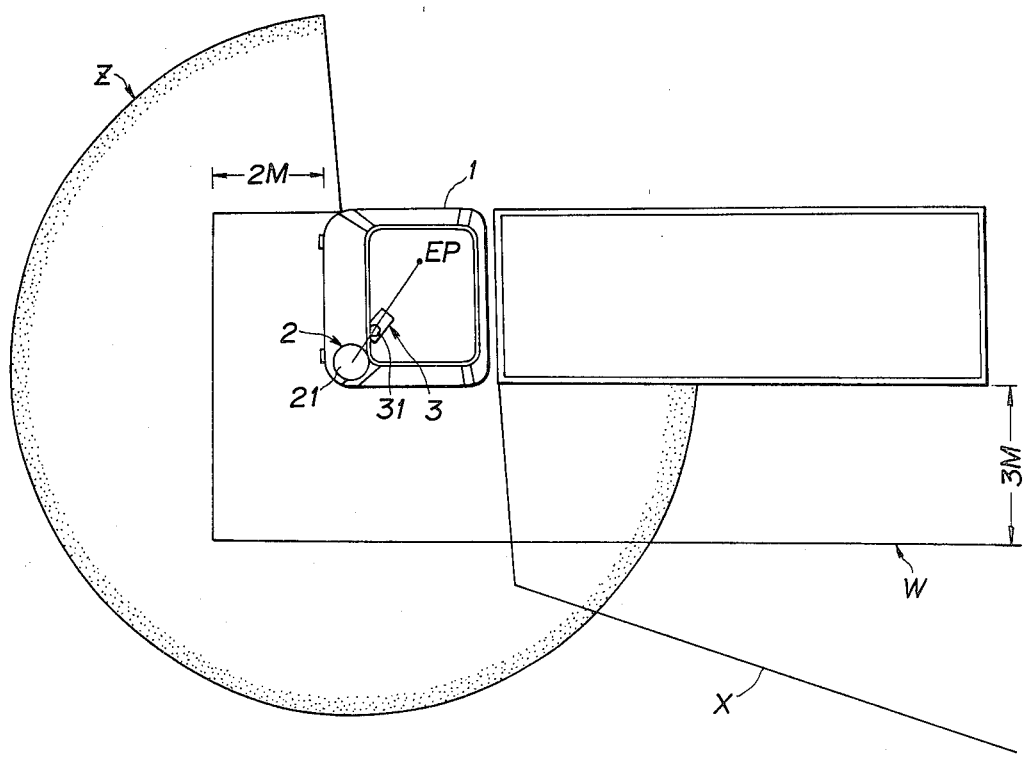
FIG. 4 is a diagrammatic explanatory illustration, showing the range of visual field provided by the mirror apparatus of the present invention shown in FIG. 3.

FIG. 4 shows the visual field provided by this mirror system.

The mirror apparatus for an automobile in this first embodiment is comprised of an objective mirror region 2 having a curved convex objective mirror surface 21 and an ocular mirror region 3 having a planar objective mirror surface 31. The objective mirror surface 21 is provided to face a ground surface region which is depicted about the vicinity of the corner located at a site outside the automobile located opposite to the driver's seat. This first embodiment further comprises a main outside mirror 2' in addition to the above-described arrangement. In the Figure, symbol GL indicates ground surface line.

The visual fields provided by the above-mentioned mirror system are: a visual field provided by the mirror apparatus which is comprised of an objective mirror region 2 and an ocular mirror region 3, and this visual field is represented by an area indicated at Z; and a visual field provided by a main side-mirror M, and this visual field is represented by an area indicated at X. Accordingly, these two visual fields Z and M perfectly cover the entire necessary visual area W. Thus, it is possible to eliminate a blind area.

Figure 5:
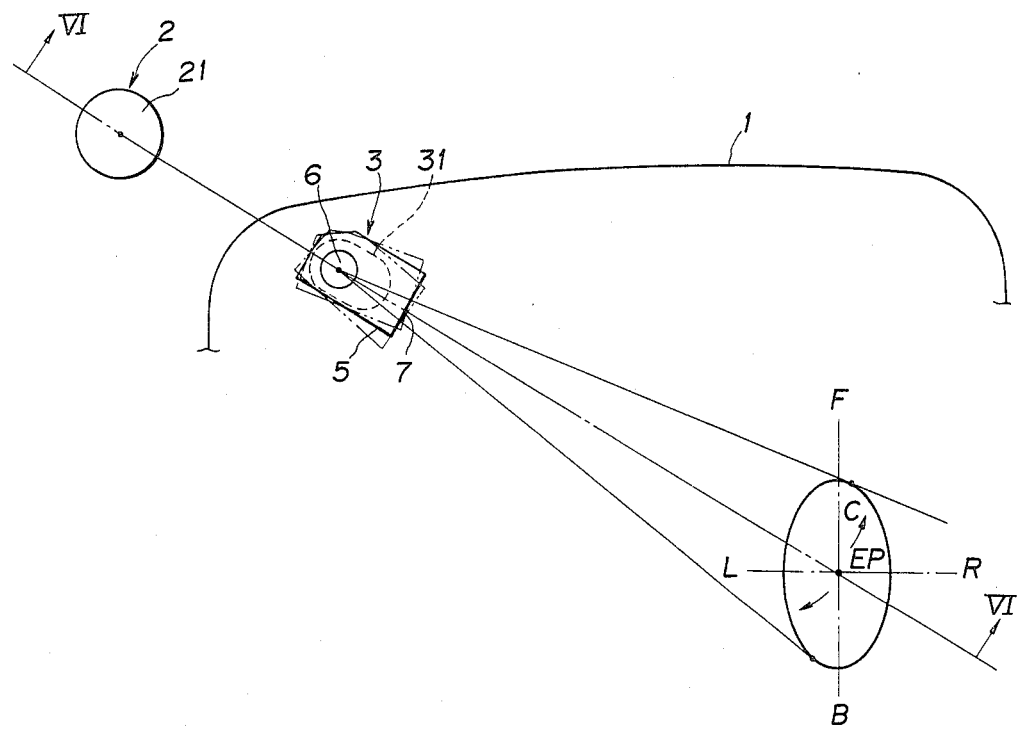
FIG. 5 is a diagrammatic explanatory illustration showing a general plan view of the mirror apparatus shown in FIG. 3.
Figure 6:
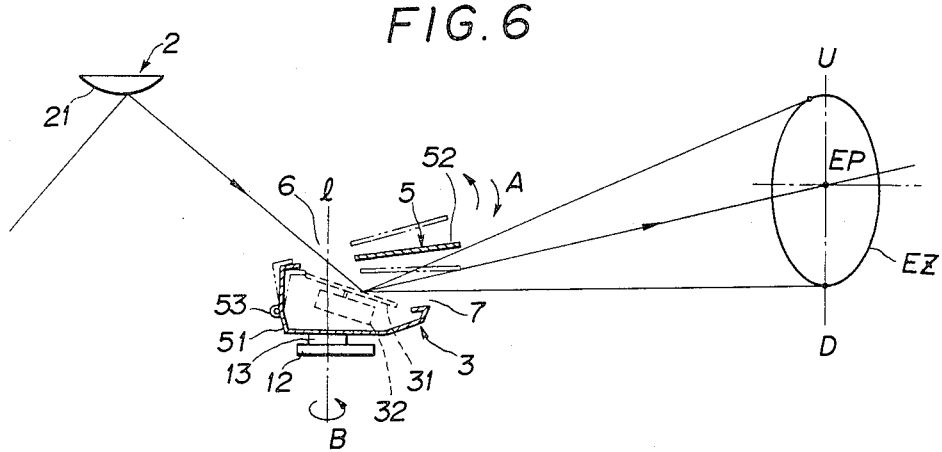
FIG. 6 is a diagrammatic sectional view taken along the line VI—VI in FIG. 5.

Explanation will next be made by referring to FIGS. 5 and 6.

The ocular mirror region 3 comprises a housing 5.

The objective mirror surface 31 is arranged in a space within said housing 5 having a first aperture 6 allowing the passage of an image reflected by the objective mirror surface 21, and a second aperture 7 for transmitting therethrough an image reflected by the ocular mirror surface 31. The first aperture 6 has a limited size necessary for accomodating the image reflected by the objective mirror surface 21 onto the ocular mirror surface 31. Because of this arrangement, the first aperture 6 only permits the passage of the necessary light rays. Accordingly, this arrangement makes it possible to obtain a necessary visual area, and at the same time, unwanted lights such as sunlight are blocked. In other words, the peripheral edge portion of the first aperture 6 of the housing 5 functions like a hood to block the entry of unnecessary lights into the eyes of the driver.

The objective mirror surface 21 of the above said mirror apparatus is provided in the vicinity of that corner of the body 1 located outside the automobile opposite to the driver's seat. In the embodiment illustrated, the driver's seat is located on the right side of the body 1 on the sheet of drawing. Therefore, the objective mirror surface 21 is provided in the vicinity of the left-side corner of the driver's chamber on the sheet of drawing.

The ocular mirror surface 31 is arranged within the housing 5 so as to be freely adjusted of the visual field. Such adjustment of position can ba accomplished by freely changing the angle of this ocular mirror surface 31 by means of a remote controlling unit 32 (FIG. 6).

Furthermore, the angle of the housing 5 can be freely adjusted relative to the upper horizontal plane of the dash-board of the automobile which serves as a member 11 for attachment of the housing 5 to the body of the automobile.

More particularly, the illustrated housing 5 is comprised of a lower fixing member 51 and an upper movable member 52. These two members 51 and 52 are attached to each other by a hinge means 53. Accordingly, the upper movable member 52 can be rotated in the directions of arrow A shown in FIG. 6. Thus, the vertical directional range in which light rays are transmitted can be varied by this arrangement. In the drawing symbol EZ represents an eye zone, i.e. a range of visual field to be provided for the driver, and symbol EP represents an eye position. Symbols U and D represent the top and the bottom margins of the range of visual field respectively. The housing 5 is secured to the attaching member 11 via a base 12, and this setting of the housing 5 is such that the housing 5 can be freely rotatated about a vertical axis 13. Accordingly, the housing 5 is rotatable about the vertical axial line l in the directions indicated at B. Therefore, even when the eye position EP varies as shown by the arrows C in FIG. 5, the eye zone EZ can be moved accordingly for adjustment. This means that the eye zone EZ can be varied and set at a desired position, i.e. back and forth and right and left directions, depending on the requirements of by the driver. In FIG. 5, symbols F and B represent front and back directions and symbols L and R represent left and right directions, respectively.

Because of the foregoing arrangement, the mirror apparatus according to the present invention is such that the eye zone EZ can be adjusted at will in accordance with the position of the eyes of the driver. Also, such an adjustment of the position of eye zone EZ can be accomplished by only rotating the housing 5 about the hinge means 53 or about the vertical axis 13. Therefore, this adjustment can be very easily accomplished by the driver while sitting at his driver's seat. Also, the vertical axis 13 has its center of rotation approximately at the center of the first aperture 6. Accordingly, the path of light rays reflected by the objective mirror surface 21 is not blocked at all, and therefore it is possible to always have the path of the light rays coming from the objective mirror surface 21 agree with the path of the light rays coming from the ocular mirror surface 31. Thus, any adjustment of mirror positions can be attained by only adjusting the position of the housing 5 by taking into consideration the eye position EP and the position of the ocular mirror surface 31.

As stated above, in case the eye position EP has made a vertical positional displacement, the adjustment of eye zone EZ can be very readily accomplished by means of the hinge 53. Also, in case the eye position EP has made a positional displacement in back and forth directions and in right and left directions, such an adjustment of eye zone can be very readily attained by the adjustment of the position of the housing 5 about the vertical axis 13. Thus, such adjustment of eye zone EZ can very easily follow the positional displacement of the eye position EP.

Furthermore, according to the mirror apparatus of the present invention, the ocular mirror surface 31 is protected by the housing 5 since it is contained thereinside, so that there is the advantage that this mirror surface 31 is not soiled easily. Moreover, even in case the ocular mirror surface 31 is damaged at such an occasion as an accident, such a damaged mirror 31 is retained within the housing 5, without the segments of the broken mirror flying around. Also, even in case the driver or a person sitting beside the driver in the driver's chamber collides with the mirror apparatus by, for example, a severe impact applied externally, the mirror assembly is rotated about the vertical axis 13 or at the hinge means 53, so that the mirror apparatus per se can absorb such impact. Accordingly, this mirror apparatus exhibits buffer action, so that it is safe for the driver as well as the person sitting beside him.

Also, as stated above, the first aperture 6 is provided in such way that only a necessary path of light is formed. Therefore, this aperture does not transmit to the driver unnecessary light rays which would be dazzling light. The present invention provides for a mirror apparatus arranged in a two-mirror style comprising an objective mirror surface 21 and an ocular mirror surface 31. Therefore, there occurs no sideways inversion of a reflected image. Also, the driver will not have an erroneous sense of direction of an objective which is discerned by the driver.

Since this mirror apparatus has no need to provide mirror surfaces having such large curvature as are encountered in the prior art, there occurs very little distortion of the image, and thus the visibility of the image is greatly improved.

The mirror apparatus according to the present invention has such a simple arrangement as explained above, and the housing 5 can be provided in a compact size, so that the mirror apparatus as a whole can be designed into a compact size accordingly. In addition, because of its structure, the housing 5 can be attached and detached easily, so that the replacement and the cleaning of the ocular mirror 31 can be accomplished easily. Moreover, it is also easy to apply a remote controlling unit 32 to remotely move the ocular mirror 31.

Figure 7:
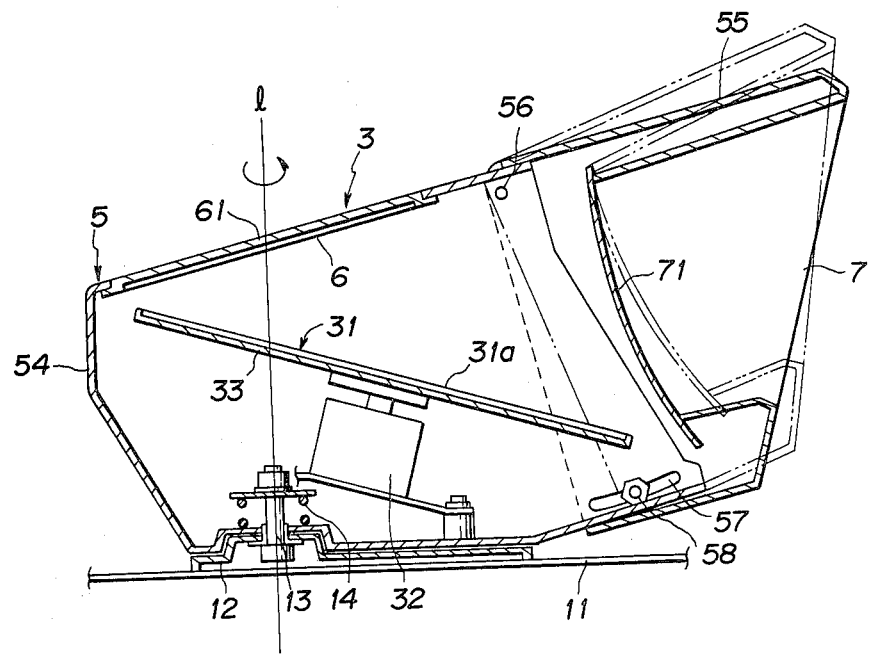
FIG. 7 is a diagrammatic sectional view of the ocular mirror region of a second embodiment of the present invention.

FIG. 7 shows a second embodiment of the present invention. In this instant embodiment, a housing 5 is constructed by a rear-side housing member 54 and a front-side housing member 55 which is attached to the foreground (on the driver's side) of the rear-side housing member 54. A first aperture 6 is formed in the rear-side housing member 54, whereat there is provided a first cover lens 61. A second cover lens 71 is arranged at a second aperture 7 of the front-side housing member 55. This front-side housing member 55 is attached, by a hinge means 56, to the vicinity of the forward end portion of the rear-side housing member 54. Thus, the front-side housing member 55 can be rotated about this hinge means 56. Such rotation or pivotal movement of the front-side housing member 55 is guided and controlled by the engagement of a protruding stud member 58 of the front-side housing member 55 in a guiding groove 57 which is provided in the lower portion of the rear-side housing member 54. Such an engagement can be designed so that it is disengaged upon application of a severe external impact.

The vertical axis 13 is provided at a site whereat a base 12 which is fixed onto the dashboard 11 of the automobile body 1 is attached to the rear-side housing member 54, so as to be rotatable about the axial line 1 illustrated in the drawing, by making this axial line of the vertical axis 13 to be substantially aligned with the center of the first aperture 6. In the Figure, numeral 14 represents a coil spring.

In this embodiment again, a remote controlling unit 32 is provided, so that an inner mirror 31a, closer to the driver, of the ocular mirror 31 which is fixed to the rear-side housing member 54 and a mirror base 34 which supports the assembly of the ocular mirror 31 and the inner mirror 31a can be inclined by remote operation.

Figure 8:
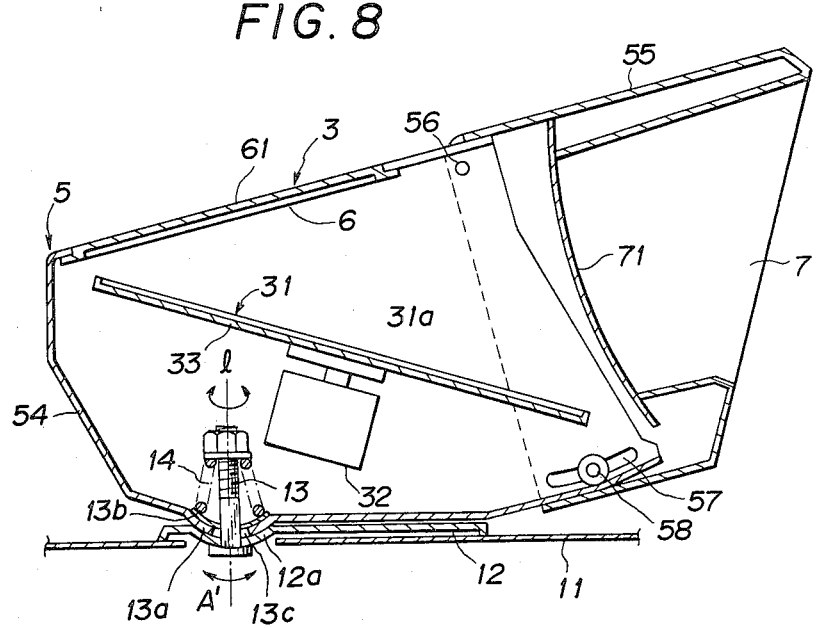
FIG. 8 is a diagrammatic sectional view of the ocular mirror region of the third embodiment of the present invention.

FIG. 8 shows a third embodiment of the present invention which is a modification of the embodiment shown in FIG. 7. In this instant embodiment, the vertical axis 13 has a pivotable structure by the arrangement comprising a semi-spherical convexed portion 13a formed locally of the housing 5, and a correspondingly concave curved receiving seat 12a formed locally of a base member 12 to which said convexed curved portion 13a snugly abuts, and actuated by a spring member 14. Thus, the vertical axis 13 not only is able to rotate about the axial line 1, but also is partially possible to pivot vertically as shown by the arrows A'. In FIG. 8, reference numeral 13b represents a seat for the spring member 14, and numeral 13c represents a cut-out for enabling vertical pivotical movement of the vertical axis 13.

Other arrangements are similar to that of the embodiment shown in FIG. 7, so that their detailed explanation is omitted.

Next, explanation will be made of a fourth embodiment of the present invention, by giving reference to FIGS. 9 to 12.

In this instant embodiment, the objective mirror 21 is supported by a U-shaped stay 4 which is secured to the automobile body 1. Also, a hood 8 is attached to this stay 4 for blocking unwanted light rays from the vicinity of this objective mirror 21 which impinge onto the objective mirror surface 21. The objective mirror 21 and said hood 8 jointly constitute an objective mirror region 2.

Figure 10:
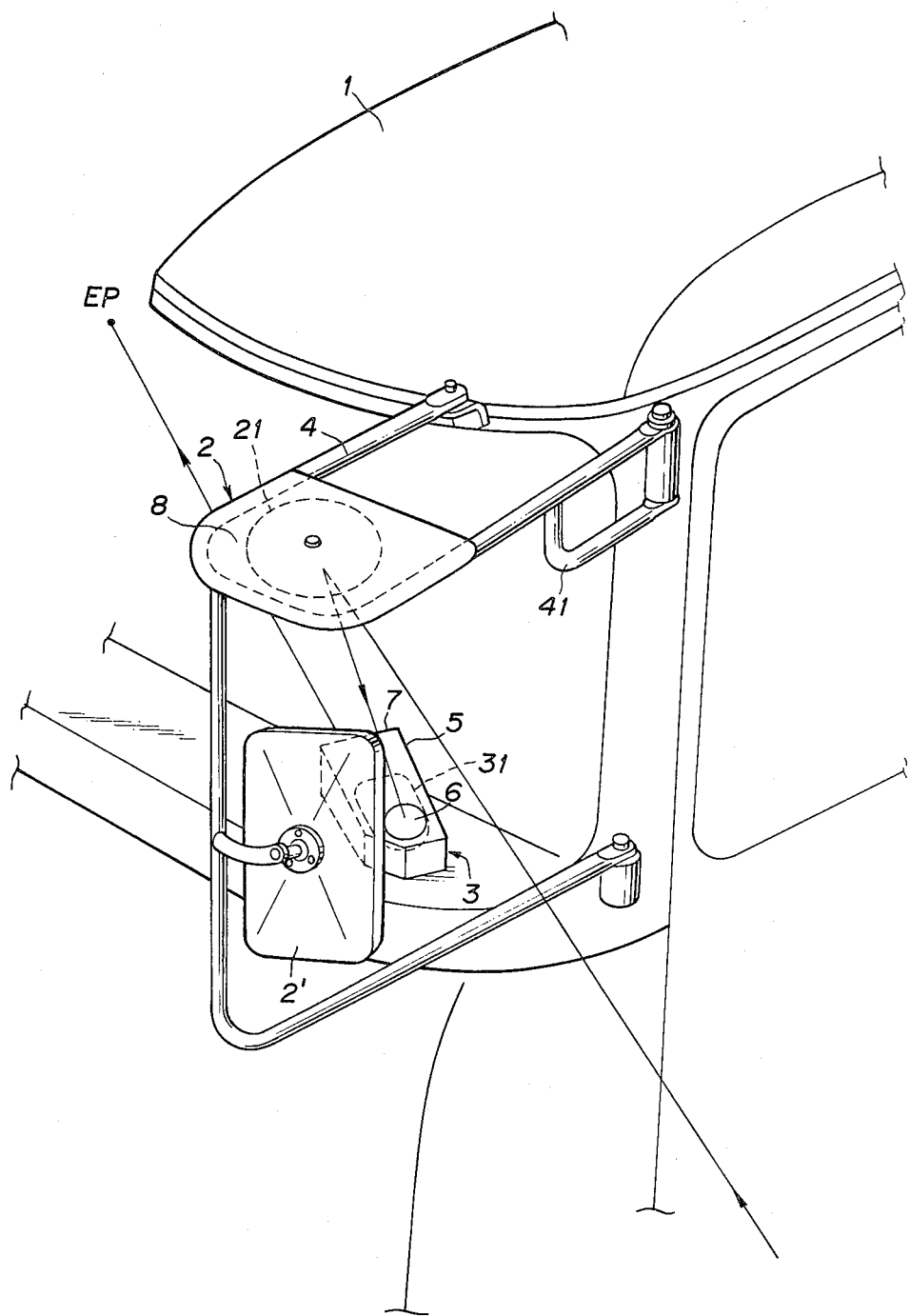
FIG. 10 is a diagrammatic perspective view, showing said fourth embodiment.
Figure 11:
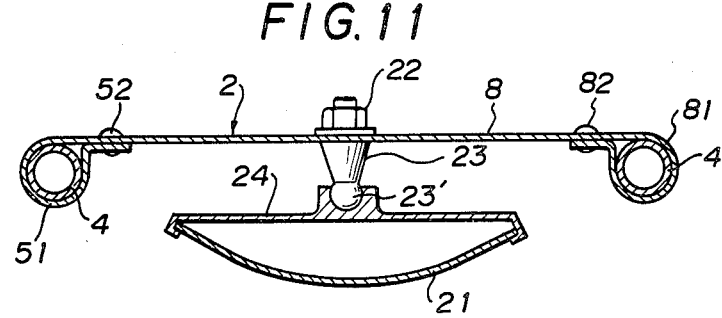
FIG. 11 is a diagrammatic sectional view of the objective mirror region of the fourth embodiment.

In this instant embodiment, the end portions of the U-shaped stay 4 are fixed to the external surface of the body 1 at two points which are located on the upper right side of the body 1 in FIG. 10. The hood 8 is mounted on the forward part of the U-shape of stay 4. The objective mirror 21 is attached to the stay 4 via this hood 8. By the employment of the U-shaped stay 4, there is obtained a desirable resistance against vibrations and strong winds and so forth.

Figure 9:
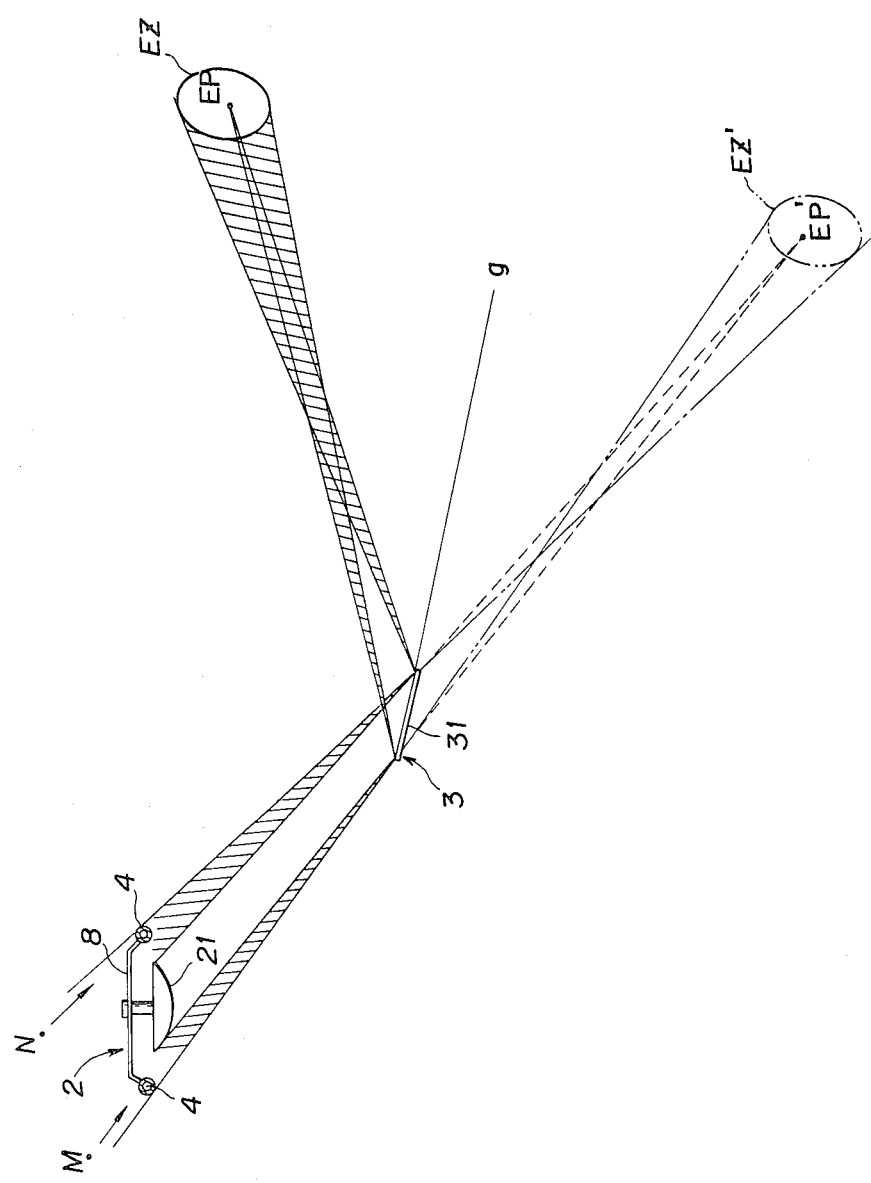
FIG. 9 is a diagrammatic explanatory illustration of light passageways for explaining the function of a fourth embodiment of the present invention.

As stated above, in the mirror apparatus of this instant embodiment, there is provided a hood 8 for blocking the entry of unnecessary lights coming from the vicinity of the objective mirror region onto the ocular mirror surface 31. Therefore, it is possible to prevent dazzling lights from impinging onto the eyes of the driver. More particularly, as shown in FIG. 9, in case light rays of the sun or street lights illuminating at, for example, points M and N which are located above the vicinity of the objective mirror region 2, these light rays will impinge onto the ocular mirror surface 31 after passing the regions located outside the objective mirror 21, and they are reflected at said ocular mirror surface 31 to enter into the range of the eye zone EZ. Thus, when the eye position EP of the driver moves within the eye zone EZ and enters into the range of incidence of unnecessary lights, such light rays will dazzle the eyes of the driver. Even in case these light rays are not dazzling lights, they will destroy normal contrast of image, and will deteriorate the visibility of image. Therefore, by the provision of the hood 8 according to the present invention, the entry of unnecessary light rays into the light paths which are indicated by hatched lines in FIG. 9 can be unfailingly prevented. Accordingly, entry of unnecessary light rays will not occur at all in the eye zone EZ. Thus, dazzling light rays are perfectly blocked.

Since a hood 8 need only be provided for a region corresponding to the eye zone EZ which is constituted by the objective mirror surface 21, the location of the hood 8 need only be selected by taking into account an imaginary eye zone EZ' which is symmetrical with respect to the reflecting mirror surface g of the ocular mirror 31.

The mirror apparatus having the above-described arrangement blocks the entry of unnecessary light rays, and thus this mirror apparatus is capable of unfailingly preventing the light rays of the sun or other light sources from impinging onto the eyes of the driver as dazzling lights. Moreover, the hood 8 is secured to the supporting stay, so that the hood is held stable, and resists vibrations as well as the pressures of wind. By employing a U-shaped stay and/or by providing a reinforcing member 41 to the stay as shown in FIG. 10, it is possible to further enhance the strength of the stay. By arranging the embodiment so that the hood is attached to the stay, it is possible to design the hood so as to conform to the configuration of the stay. Thus, it is possible to mount a hood of a relatively large size to the stay, and accordingly, it is possible to enhance the light-blocking effect. Also, it is possible to design the hood to match the style of the stay. Furthermore, as in the above-described preceding embodiments, the instant embodiment is of a two-mirror style. Therefore, there is no sideways inversion of the image, and the driver can easily have a directional sense for the objectives. In addition, there is no need to increase the curvature of the mirror, so that there is obtained an image having greatly reduced distortion. Moreover, this embodiment provides for a large visual field and a good visibility. Thus, the instant embodiment has many advantages.

The above-described and illustrated embodiment has such concrete structure as will be described below.

To begin with, the hood 8 is attached to the forward end portion of the U-shaped stay 4, as described already. More particularly, the peripheral edge portions of the hood 8 are bent so as to surround the circumferential portions of the stay 4 to provide a holding region 81 which is fastened to each extensions thereof by such means as rivets 82 in such way that the rod portions of the stay are nipped by the holding region 81, and thus the hood 8 is secured to the stay 4.

The objective mirror 21 is supported by a pivot means 23 via a nut 22 at substantially the central portion of the hood 8. By forcing a spherical portion 23' of the pivot means 23 into a mirror body 24 of the objective mirror 21, this objective mirror 21 can be supported for free tilting in a desired direction.

Figure 13:
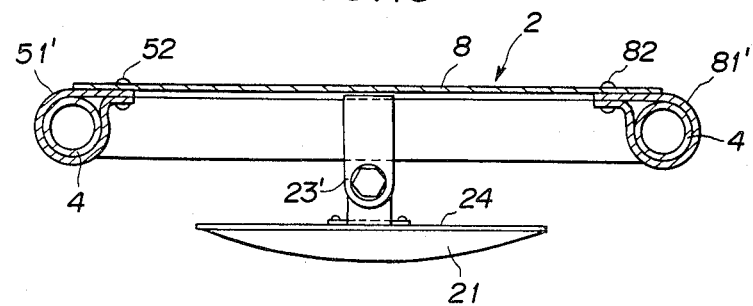
FIG. 13 is a diagrammatic sectional view of the objective mirror region of a fifth embodiment.
Figure 14:
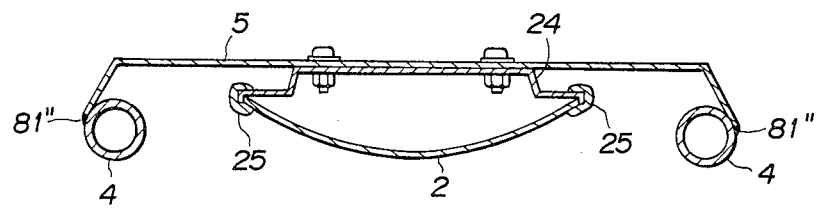
FIG. 14 is a diagrammatic sectional view of the objective mirror region of a sixth embodiment.

The attachment structure of the hood 8 and the objective mirror 21 as described above may be modified in a manner as shown in FIG. 13 with respect to the fifth embodiment, or as shown in FIG. 14 with respect to the sixth embodiment.

The embodiment shown in FIG. 13 is such that a bracket 81' which is a separate member other than the hood 8 is secured to the peripheral edge portion of the hood 8 by such menas as rivets 82. Also, the stay 4 is held by this bracket 81', and thus the hood 8 is mounted. On the other hand, the objective mirror 21 is attached, not to a pivot means, but by means of a bracket 23' which, in turn, is fixed to the hood 8. This bracket 23' is secured to the mirror body 24. Thus, the objective mirror 21 is attached to the hood.

The embodiment shown in FIG. 14 is arranged so that a hood 8 is mounted on a stay 4, and they are welded together by a welding portion 81''. Also, the mirror body 24 of the objective mirror 21 is secured directly to the hood 8 by bolt and nut means. The joint portion of the mirror body 24 and the objective mirror 21 is nipped by a ring 25.

Referring now back to FIG. 10, description will be made of a concrete structure of the fourth embodiment.

Figure 12:
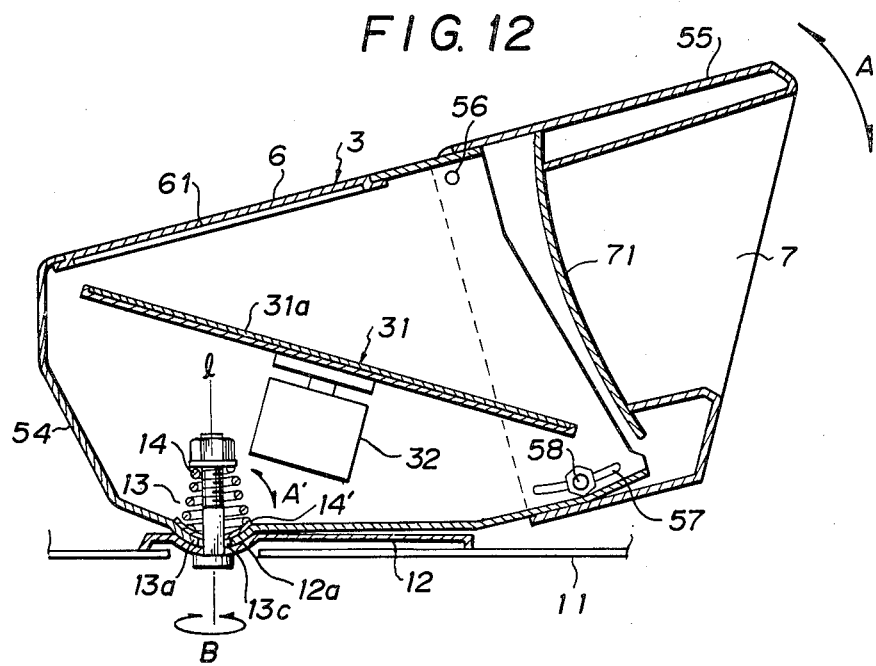
FIG. 12 is a diagrammatic sectional view of the objective mirror region of the same embodiment.

The ocular mirror 31 of this instant embodiment is arranged within a housing 5 which constitutes an objective mirror region 3, as shown in FIG. 10. This housing 5 is comprised of a front housing 55 and a rear housing 54 as shown in FIG. 12 and as will be described in further detail. This housing 5 further has a first aperture 6 for receiving therethrough an image reflected from the objective mirror surface 21, and a second aperture 7 for transmitting the image reflected at the ocular mirror surface 31 to the eyes of the driver. Said first aperture 6 is designed so that only necessary light rays are passed therethrough. In other words, arrangement is provided so that a necessary visual area can be obtained, and at the same time that unnecessary portions of area are blocked.

As shown in FIG. 12, the first aperture 6 of this instant embodiment is formed in the rear housing 54 wherein there is arranged a first cover lens 61. A second cover lens 71 is provided for the second aperture 7 of the front housing 55. The front housing member 55 is secured, via a hinge means, to the vicinity of the forward end portion of the rear housing member 54. The front housing member 55 is able to make pivotal movement about said hinge means. By adjusting the pivotal movement of the front housing member 55, the direction of emission of light rays through the second aperture 7 of the front housing member 55 can be varied vertically as indicated by the arrows A in FIG. 12. It should be noted that a projection 58 of the front housing member 55 engages a guide groove 57 which is provided in the lower portion of the rear housing member 54, so that the guiding as well as the controlling of this guiding of the pivotal movement are accomplished by this engagement. It should be noted also that this engagement of the two items is released upon application of a strong external impact. Also, the rear housing member 54 is secured to a dashboard 11 of the automobile body 1 via a base 12. This attachment of the rear housing member 54 to the base 12 is accomplished via a vertical axis 13. By virture of this vertical axis 13, the rear housing member 54 is rotatable about an axial line 1 in the directions indicated by B. By an adjustment of position of the rear housing member 54 through said rotation thereof, the direction of emission of light rays through the second aperture 7 can be varied sideways and also in back and forth directions. The vertical axis 13 is arranged further so that a semi-spherical convexed portion 13a is formed locally in the rear housing member 54, and said convexed curved portion 13a is arranged to abut a receiving seat 12a which has a correspondingly curved concave surface relative to the base 12. This assembly is actuated by a spring means 14. Therefore, the mirror apparatus not only is able to rotate about the axial line 1, but also it can be partially pivoted vertically in the direction indicated by A'. In the Figure, numeral 14' represents a seat for the spring means 14. Numeral 13c represents a cut-out for enabling vertical pivotal movement of the vertical axis 13. Numeral 32 represents a remote controlling unit for tilting the ocular mirror 31. In case the ocular mirror 31 is tilted by the use of this remote controlling unit 32, there could occur an instance that the hood 8 blocks the visual field due to such tilting and that accordingly the normal transmission of image to the driver's eyes may be hampered. In order to avoid such occurrence, the hood 8 per se can be constructed so as to be moved.

By the employment of such front housing member 55 as that described above, the driver is able to very easily displace the eye zone, only by adjusting the position of the front housing member 55 while sitting in the driver's chamber. Thus, not only the adjustments can be made immediately in accordance with the variation of the eye position of each driver, but also the ocular mirror surface 31 itself can be protected by virtue of the housing 5. Thus, the mirror surface 31 cannot be soiled easily. Furthermore, flying broken mirror segments can also be prevented. Moreover, even when the mirror is hit by a driver or other person, the cover member will exhibit the function as a buffer means. Also, since the arrangement of the mirror apparatus is designed so that unnecessary light rays are not brought onto the eyes of the driver, this arrangement plus the provision of the hood will further enhance the effect of preventing dazzlement.

Next, description will be made of a seventh embodiment by referring to FIGS. 15 and 16.

In this instant embodiment, the first aperture 6 of the housing 5 is limited to a size required for blocking the entry of unnecessary light rays, and moreover any dazzling lights are prevented from their entry onto the driver's eyes without the use of hood means when such dazzling lights otherwise are to impinge onto the driver's eyes.

This instant embodiment can be effectively used in such circumstance as described below. Let us now consider that the sun is positioned in the direction designated at point M in FIG. 15 when viewed from inside the driver's seat. In case the eye position EP has moved to a site located within the crescent-moon-shaped range as indicated by symbols $P_0$, $P_1$ and $P_2$ as viewed from the reference position shown, the sunlight will pass through the course indicated by the lines and is reflected at the ocular mirror surface 31 to reach the eyes of the driver as a dazzling light.

Similarly, in case the sun is positioned at N, the sunlight will rech the crescent-moon-shaped range indicated by symbols $Q_0$, $Q_1$ and $Q_2$. Therefore, in case the eye position EP enters into this range, the sunlight will be a dazzling light to the driver. After all, however, such dazzling light will not enter into that portion which is blocked by the objective mirror 21, i.e. into the central portion of the eye zone EZ. However, there is the fear that dazzling lights such as sunlight and street lights could enter into the peripheral marginal portions of the eye zone. The instant embodiment intends to prevent the entry of such dazzling lights to the eyes of the driver.

The mirror apparatus of this embodiment provides for a lens 61 for the first aperture 6. This lens 61 is divided into a central region 61a and a peripheral region 61b as shown in FIG. 16, in such way that the transmissibility of light rays is reduced only in the peripheral region 61b. This peripheral region 61b serves to function as a cover for the ranges defined by lines IT and RU and the range defined by lines JW and SV. Dazzling lights will unfailingly pass through these regions.

As a result, those light rays which could constitute dazzling lights will pass through these regions of low transmissibility of light. Accordingly, the intensity of light will be attenuated by its passage therethrough. Thus, even if these lights enter onto the eyes of the driver, they will no longer be dazzling lights.

Figure 15:
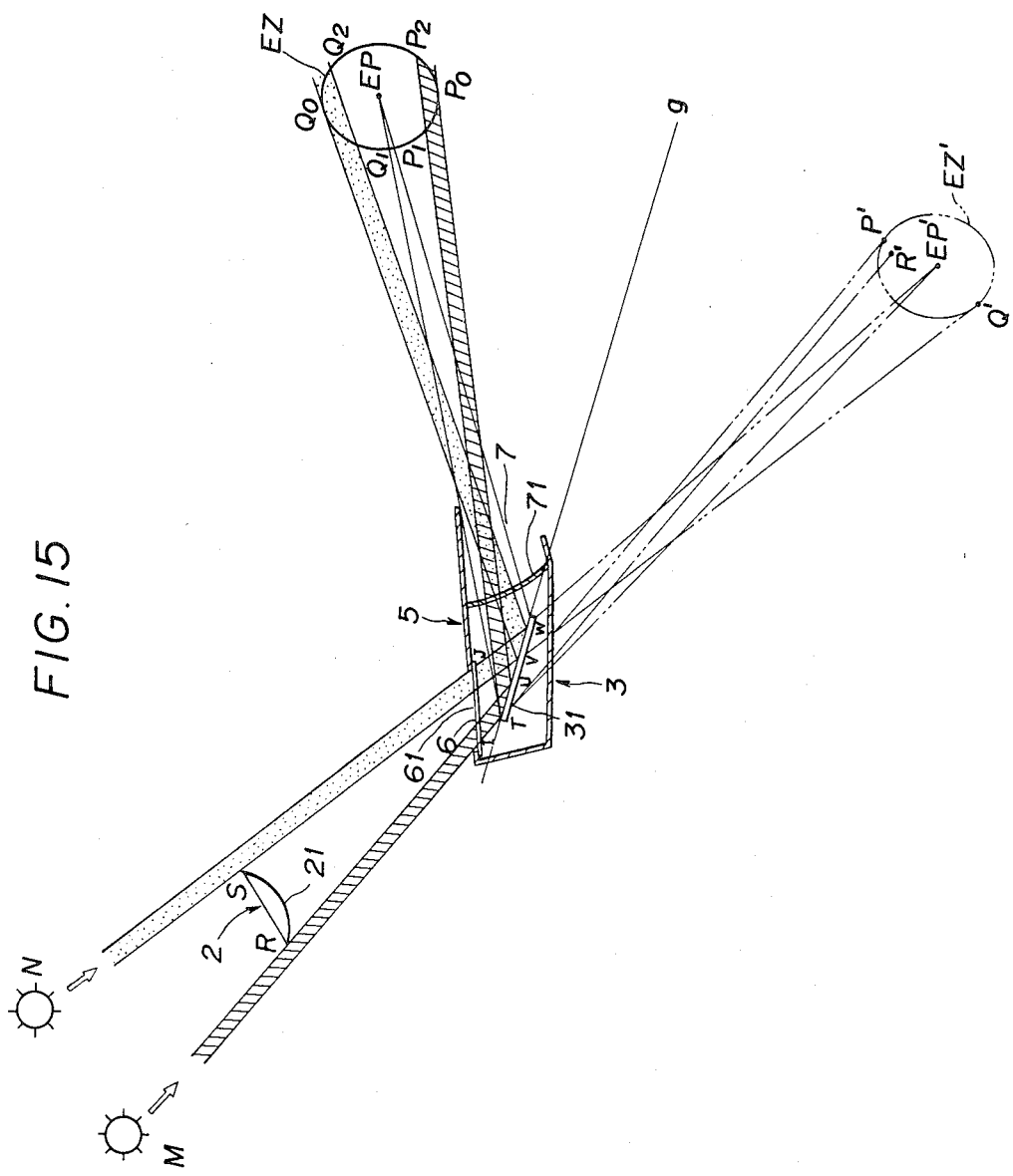
FIG. 15 is a diagrammatic illustration of light passageways for explaining the function of a seventh embodiment.
Figure 16:
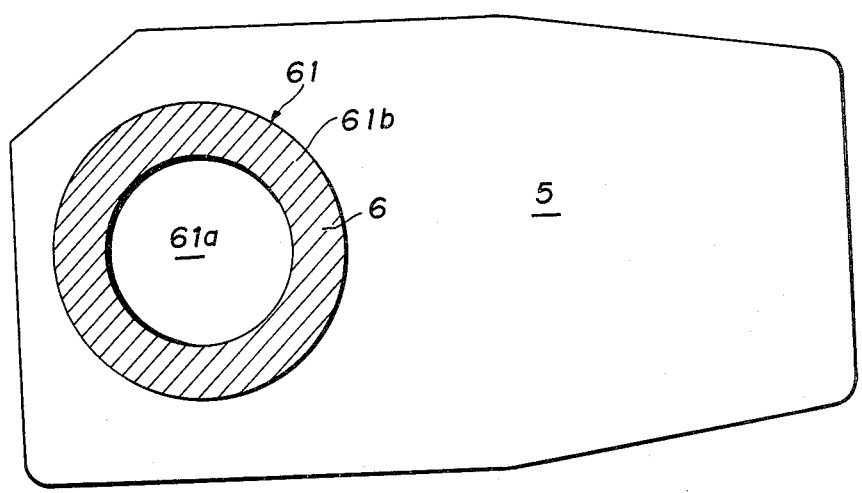
FIG. 16 is a diagrammatic plan view of a first aperture region of the seventh embodiment.

The regions of low transmissibility of light rays of the lens 61 need only be designed so as to correspond to those portions of lights not blocked by the objective mirror 21, as explained by giving reference to FIG. 15. Such setting of the low transmissible regions may be made by an imaginary eye zone EZ' which is symmetrical relative to the reflecting surface g of the ocular mirror 31 shown in FIG. 15, i.e. by the use of the eye zone EZ' which is depicted by drawing straight lines of the light paths from the objective which is to be viewed. In FIG. 15, symbols P' and Q' represent points contacting the eye zone EZ. Symbol R' represents a position corresponding to the outermost portion R of the objective mirror region 2. The reduction of transmissibility of light of the lens 61 may be made by an appropriate means such as by forming a filter at the marginal regions of the lens 61 by coloring such marginal regions.

Figure 17:
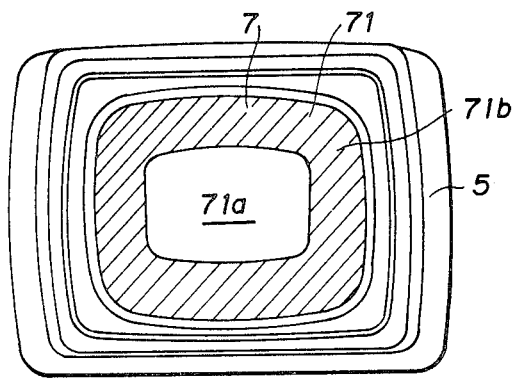
FIG. 17 is a diagrammatic plan view of a second aperture region of an eighth embodiment.

FIG. 17 shows an eighth embodiment of the present invention. This mirror apparatus is of the arrangement that the lens 71 of the second aperture 7 is divided into a central region 71a and a peripheral region 71b in much the same way as for the first lens for the preceding embodiment, and this peripheral region 71b of the lens 71 has a reduced transmissibility of light. This embodiment is able to provide similar effect as given by the seventh embodiment.

Figure 18:
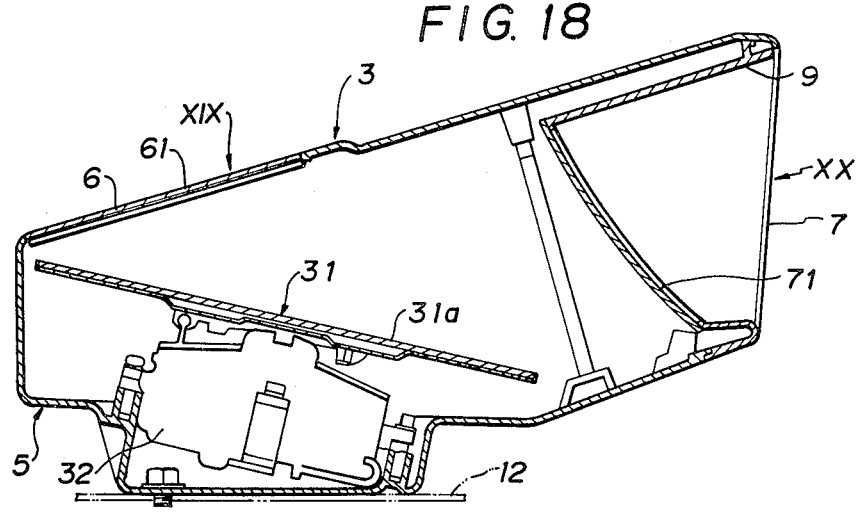
FIG. 18 is a diagrammatic sectional view of the ocular mirror region of a ninth embodiment.
Figure 19:
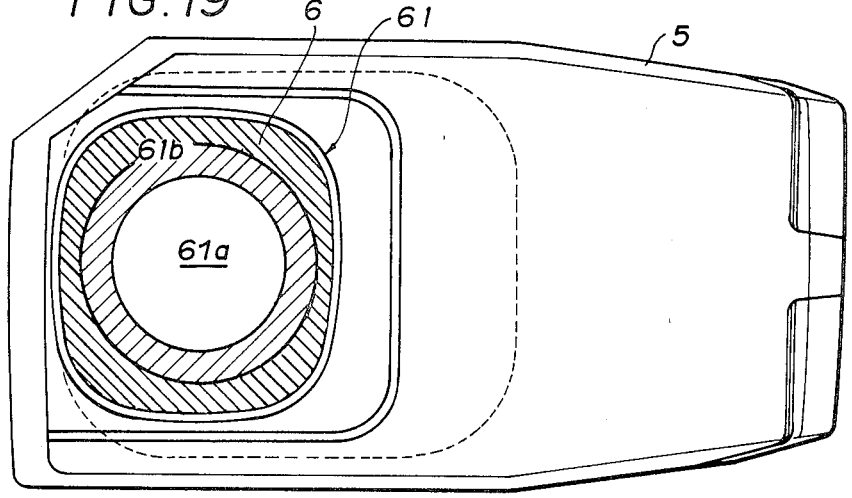
FIG. 19 is a diagrammatic plan view of a first aperture region of the ninth embodiment, and corresponds to the view of FIG. 18 taken in the direction of the arrow XIX in FIG. 18.
Figure 20:
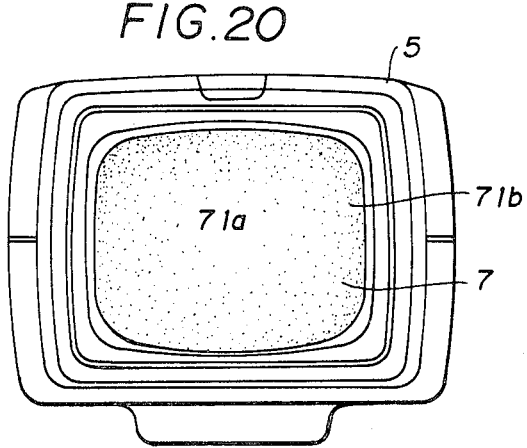
FIG. 20 is a diagrammatic plan view of a second aperture region of the ninth embodiment, and corresponds to the view taken in the direction of XX in FIG. 18.

FIGS. 18 to 20 show a ninth embodiment of the present invention.

This instant embodiment is of the arrangement that both the first lens 61 of the first aperture and the second lens 71 of the second aperture 7 are divided respectively into central region 61a, 71a and peripheral regions 61b, 71b having reduced transmissibility of light. However, the lens 61 for the first aperture 6 is arranged so that its peripheral region 61b is constructed to have two-stage transmissibilities of light as shown. The outermost marginal region has lower transmissibility of light than the inner region. Also, the peripheral region 71b for the second aperture 7 is of the construction that the transmissibility of light is lowered as the portions of the surface goes farther toward its periphery.

In the Figures, numeral 12 represents a bracket for attachment of the mirror apparatus to the body of automobile. A housing 5 is mounted onto the automobile body via this bracket 12. Numeral 9 represents a support for supporting the lens 71, and is incorporated with the housing 5. Numeral 32 represents a remote controlling unit which allows the driver to operate the ocular mirror 31 remotely.

Though not shown, that region of the housing 5 located on the site where the bracket 12 is provided may be journaled by a vertical axis in a manner similar to that shown in the first to sixth embodiments to permit rotation of the housing 5. Also, the housing 5 may locally have a hinge structure to permit vertical pivotal movement of same. Thus, the position of the second aperture 7 may be easily varied, to enable a very easy adjustment of the eye zone.

It should be understood that the foregoing description relates to only preferred embodiments of the present invention, and that the present invention is not limited thereto except as defined in the appended claims.

What is claimed is:

1. A mirror apparatus for automobile, comprising an objective mirror region having a convexed curved objective mirror and a planar ocular mirror region having a planar ocular mirror, wherein:

said objective mirror is provided to face an area of ground surface centering around the vicinity of that corner within a driver's chamber located opposite to the driver's seat, said ocular mirror is provided within a space of the ocular mirror region having a first aperture for receiving therethrough an image reflected by said objective mirror and a second aperture for transmitting therethrough to the driver an image reflected by said ocular mirror, and said first aperture has such a limited size as is required for receiving the image from said objective mirror region that is reflected by said objective mirror.

2. A mirror apparatus according to claim 1, in which said ocular mirror is provided within an inner space of said objective mirror region for free adjustment of its visual field.

3. A mirror apparatus according to claim 2, in which said ocular mirror region includes a housing having a first aperture and a second aperture, said housing is attached to a body of said automobile and is freely moveable with respect to said automobile at that side of said housing which is attached to said body, and said housing is rotatable and pivotable about a vertical line and is pivotable with respect to a horizontal line as viewed from the driver's seat.

4. A mirror apparatus according to claim 3, in which said ocular mirror is provided within said housing for free adjustment of its visual field.

5. A mirror apparatus according to claim 1, further comprising a light-blocking hood extending to project beyond marginal edges of said objective mirror of the objective mirror region.

6. A mirror apparatus according to claim 5, in which said first aperture of the ocular mirror region has such limited size as will reflect said objective mirror surface and those portions of said light-blocking hood which are located beyond the marginal portions of said objective mirror.

7. A mirror apparatus according to claim 1, in which either one of said first aperture and said second aperture of said ocular mirror region is provided, at its peripheral portions, with cover means having a reduced transmissibility of light rays as compared with those portions of said aperture located inner than said marginal portions.

8. A mirror apparatus according to claim 1, in which both of said first and second apertures of said ocular mirror region are provided, at their marginal portions, with cover means each having a reduced transmissibility of light rays as compared with those portions of said apertures located inner than said marginal portions.

9. A mirror apparatus according to claim 8, in which said cover means have such transmissibility of light rays as will become lower as the portions of the cover means go closer toward the marginal edges thereof.

10. A mirror apparatus according to claim 2, in which said objective mirror region has a main body portion and a light-blocking hood portion, and said hood portion is operable for adjustment of position so as not to block transmission of image to the driver when a visual field provided by said ocular mirror is adjusted.

* * * * *